UNITED STATES PATENT OFFICE.

PAUL ERNERT, OF LUDWIGSHAFEN, GERMANY.

PROCESS OF MAKING SALICYLATE OF PHENYL.

SPECIFICATION forming part of Letters Patent No. 486,770, dated November 22, 1892.

Application filed January 18, 1892. Serial No. 418,450. (Specimens.) Patented in England August 22, 1891, No. 14,224, and in Belgium August 29, 1891, No. 96,204.

*To all whom it may concern:*

Be it known that I, PAUL ERNERT, a subject of the King of Saxony, residing at Ludwigshafen, a city of the Kingdon of Bavaria, Germany, have invented certain new and useful Improvements in Processes for the Preparation of Salicylate of Phenyl, (for which Letters Patent have been obtained in Belgium, No. 96,204, dated August 29, 1891, and in Great Britain, No. 14,224, dated August 22, 1891,) of which the following is a specification.

In chemical literature (see *Beilstein Org. Chemistry*, second edition, Vol. 11, page 951) it is stated that salicylic acid sublimes undecomposed when carefully heated, but is partly decomposed when rapidly distilled into carbonic acid and phenol, a similar decomposition slowly taking place by heating this compound with water in a closed tube to 220° to 230° centigrade. These statements are so far inaccurate—that is to say, wrong—that it does not depend upon a careful or rapid heating, but upon the temperature at which the salicylic acid is heated. Salicylic acid sublimes without decomposition only below the melting-point, above which decomposition always takes place, being very trifling at a temperature slightly above such melting-point and increasing in proportion with the increase of temperature.

I have discovered that salicylic acid heated to a high temperature—about 160° to 240° centigrade—is decomposed into salicylate of phenyl with the separation of water and carbonic acid if during the heating the water formed is distilled off and the access of air is carefully avoided.

Hitherto salicylate of phenyl was prepared by heating salicylic acid and phenol with dehydrating agents. That the formation of salicylate of phenyl, which occurs according to my invention should have been hitherto overlooked, may be explained by the fact that little or no salicylate of phenyl is obtained by heating under ordinary circumstances salicylic acid to a high temperature, as this salicylate of phenyl or the intermediate products causing its formation are again decomposed by ted water or by the action of the air, and as, moreover, small quantities of salicylate of phenyl are hardly noticeable, as they are readily dissolved in phenol and do not separate alone. Under these circumstances it is questionable whether the phenol appearing in the ordinary heating of salicylic acid is a direct product of decomposition of this acid. Should this hypothesis be assumed, the formation of salicylate of phenyl acid, according to my invention, can be explained, inasmuch as under the given conditions the phenol produced from the decomposition of a molecule of the acid is immediately under separation of water combined with a second molecule of the acid, according to the equations,

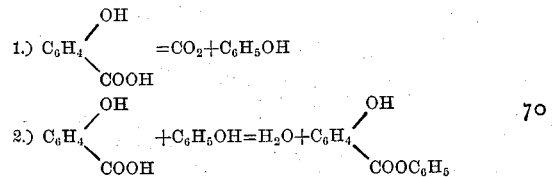

wherein the combination of the salicylic acid with the phenol without the use of dehyrating agents must be due to the action of phenol in the nascent state, since these compounds do not combine under ordinary circumstances. On the other hand, and this is the most likely explanation, there may be formed with the withdrawal of the water anhydrides or anhydride-like combination of the salicylic acid, which are subjected later on under evolution of carbonic acid either to an intra-molecular decomposition or to a decomposition, in which some of the undecomposed salicylic acid is retained, thus forming salicylate of phenyl in the following manner, for example:

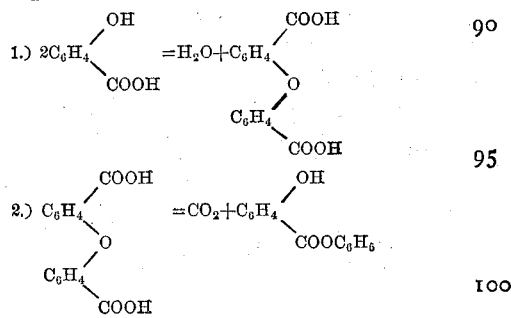

In this assumption the formation of anhydride within the hydroxyl groups appears probable, as an addition of phenol does not increase the production.

Under the conditions above set forth the theoretic yield of salicylate of phenyl can be easily reached approximately, so that two kilos of salicylic acid produce without the use of phenol and dehydrating agents from 1.4 to 1.5 kilos of salicylate of phenyl. For this purpose the operation is conducted as follows: Pure or even crude salicylic acid is heated for about four hours in a bath at a temperature from 220° to 230° centigrade. The flask of glass or other suitable material containing the acid is provided with a narrow neck projecting a suitable distance out of the bath and having such a temperature that the ascending steam may not run in a condensed form down the bottom of the vessel, but reach a small bulb or receptacle connected to the neck and resembling those used in apparatus for carrying out fractional distillation, the water running out from this bulb through an outlet-pipe. If the neck of the flask be maintained at a temperature not considerably above that required for the above object, which may occur through cooling, no other substance will escape from the neck of the flask besides the water and the carbonic acid evolved. To prevent the access of air, the flask is filled before heating with an inert gas—such as carbonic acid—a feeble current of this gas being conveyed during the heating operation through the water-bulb in the direction of the outlet-pipe. The salicylate of phenyl formed is washed with water, or, if required, with a solution of soda, and is crystallized by means of alcohol or other suitable solvent.

Having now particularly described and ascertained the nature of my invention and in what manner the same is to be performed, I declare that what I claim is—

The herein-described process of producing salicylate of phenyl, which consists in heating salicylic acid at or about 230° centigrade with air, substantially excluding and vaporizing the water.

In testimony whereof I have signed my name to this specification in the presence of two subscribing witnesses.

PAUL ERNERT.

Witnesses:
 ALBERT KNOLL,
 ORWALD KING.